Patented Oct. 11, 1932

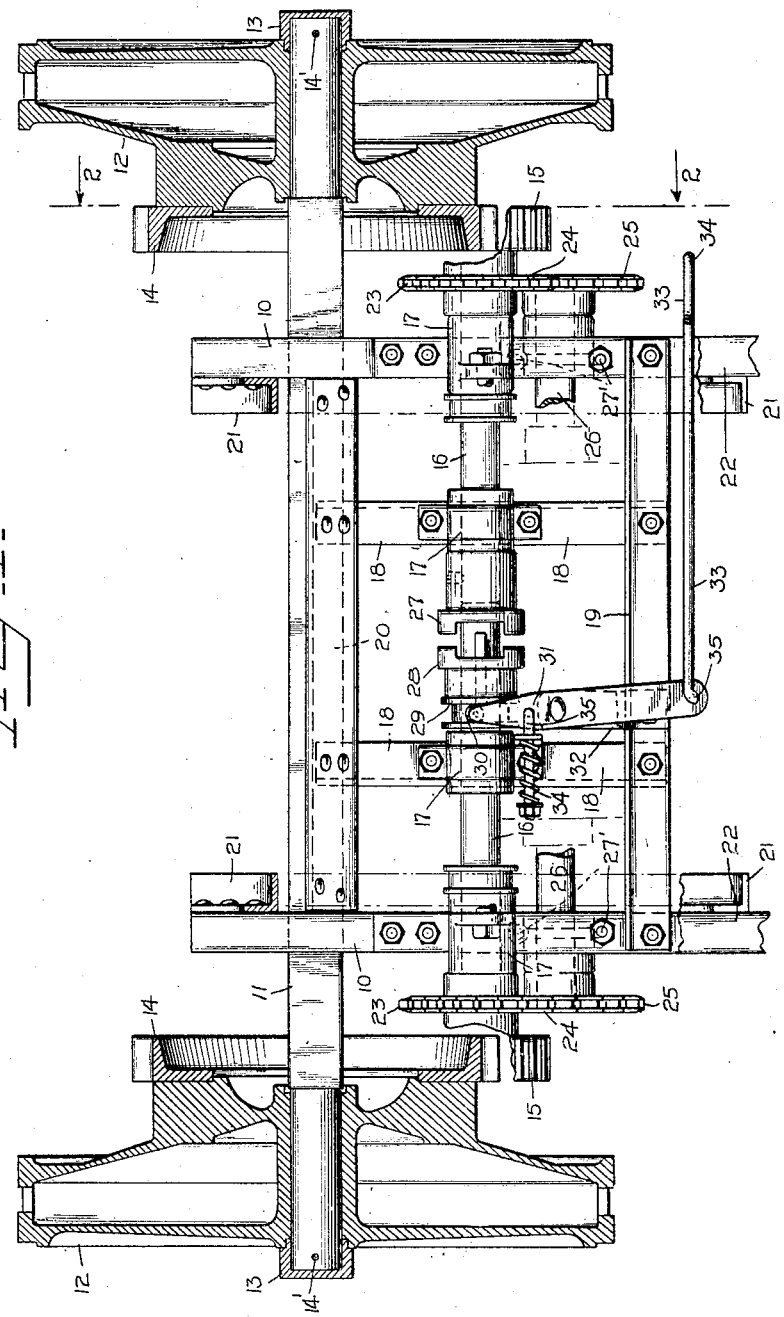

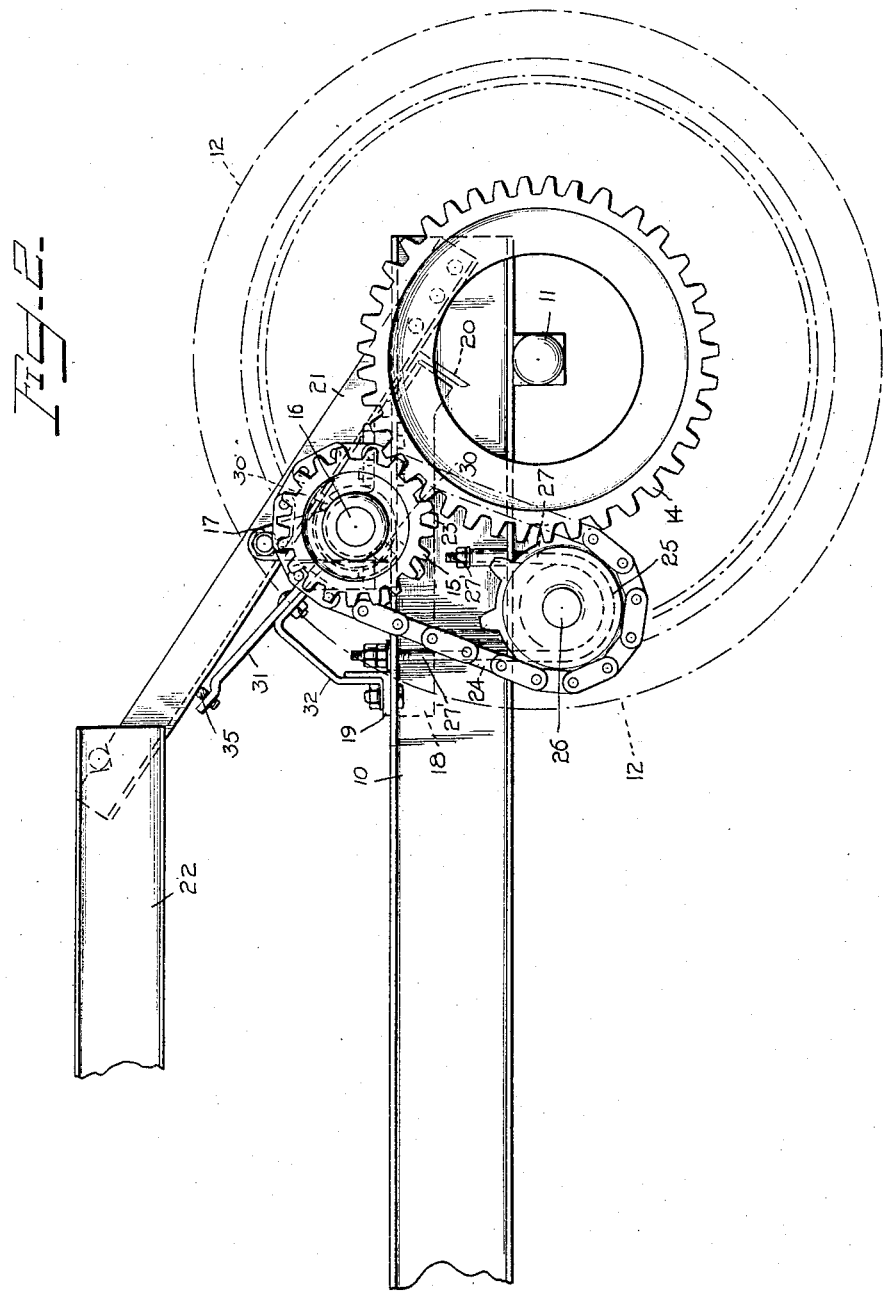

1,882,628

UNITED STATES PATENT OFFICE

FREDERIC W. JAMES, OF BELLEVILLE, NEW JERSEY, ASSIGNOR TO N. P. NELSON IRON WORKS, INC., OF PASSAIC, NEW JERSEY, A CORPORATION OF NEW JERSEY

LOCK SHAFT

Application filed February 27, 1930. Serial No. 431,844.

This invention relates to improvements in the differential drive mechanism of motor propelled vehicles and had reference particularly to a clutch controlled lock shaft interposed between the differential and wheel shafts whereby the traction wheels are differentially driven in the ordinary manner or caused to turn together at the same speed.

The present invention is particularly applicable for use in connection with a vehicle or tractor equipped with loading apparatus which necessitates crowding thereof during its operations. Should a slippery pavement or any other condition permit one traction wheel to spin, the tractive power would be destroyed and it only requires that the two traction wheels be compelled to work together at the same speed to overcome the difficulty.

With the foregoing in mind, it is the purpose of my invention to provide a clutch controlled lock shaft in the power transmission unit of a motor driven vehicle, which is capable of connecting the traction wheels to turn together at the same speed and of disconnecting the same to operate at the ordinary differential speeds.

I accomplish this purpose by means of the combination and arrangement of parts hereinafter described in the specification, set forth in the appended claims and illustratively exemplified in the accompanying drawings, in which Figure 1 is a plan view of the traction wheel end of a tractor frame showing the lock shaft disconnected and the clutch released; and Figure 2 is a substantially longitudinal sectional view taken on line 2—2 of Figure 1.

Referring to the drawings, 10 denotes the longitudinal side beams of the tractor chassis which receive their support from a square axle 11, projecting outside the beams at its ends where the transverse section thereof is round to afford axles for traction wheels 12. The wheels 12 are held in position on their axle by means of caps 13 which carry pins 14' projecting through the ends of the axle. Each wheel 12 on its inner face is provided with an external gear 14 which is held constantly in mesh with a pinion drive gear 15 mounted on the end of one of a pair of jack shafts 16. The jack shafts 16 comprise two sections of shafting, coaxially alined in bearings 17, the outermost thereof being carried on the side beams 10, while the inner bearing members are supported on short beams 18 running parallel to the side beams 10. The short beams 18 receive their support at one end on a cross L-beam 19 which is mounted at its ends on the side beams 10, the opposite ends of the beams 18 being annularly bent to attach to one side of a second cross L-beam 20. The beam 20 is attached to the under sides of upwardly inclined beams 21, which are in turn, attached to the extreme ends of side beams 10 at their lower ends, while the upper ends receive their support on a pair of beams 22 forming the superstructure of the tractor.

Turning with the pinion gears 15, between the latter and the outside bearings 17 of each section of the lock shaft 16 is a sprocket 23 carrying one end of a chain 24, the opposite end being driven by a second sprocket 25 mounted on and turning with the differential drive shaft 26. The bearings for the outer ends of the differential shaft 26 are hung beneath the side beams 10 on U-shaped straps 27'.

Referring now to the jack shafts 16, the latter abut each other at their inner ends between the inner bearings 17, and one jack shaft 16 carries one section 27 of a clutch, section 27 being fixed to turn with the shaft. The other section 28 of the clutch is carried on the other jack shaft and is mounted to slide longitudinally thereof into engagement with the section 27. The clutch section 28 is provided with a grooved collar 29 for receiving the rollers 30 at one end of a lever arm 31 which is pivotally mounted on an upright bracket 32 carried by the rear cross beam 19. The free end of the clutch lever 31 is manipulated to throw the clutch by means of a handle 33, the outer end of which is provided with a hand grip 34 and is disposed at the side of the tractor within easy reach of the operator. The clutch is normally held disengaged by a spring 34, which is carried by a bolt 35 disposed between one end of the latter and the upright portion of a bracket on the beam 18, the bolt 35 being slidably supported in an eye in the bracket and its end hooked in an opening in the lever 31 between its pivot and the rollers 30.

The operation of my invention is briefly described in the following: It will be assumed that the tractor motor is being operated to impart movement to the loading attachment and further, that by manipulation of the clutch, the traction wheels are caused to gradually crowd the loader into the material to be picked up. Under ordinary conditions, the crowding may be effectively carried out without utilizing the lock whereby the two traction wheels of the tractor are made to rotate together and at the same speed. However, it is with conditions where such a lock is necessary that the present invention applies. The operator observing that one of the traction wheels has a tendency to spin, pushes the handle 33 inwardly thereby causing the clutch lever 31 to engage the clutch members 27 and 28. This unites the jack shafts 16 into an integral shaft receiving its power through both chain connections 24 and imparting it to the traction wheels 12 so that the latter turn together and at the same speed, thus enabling the tractor to crowd the loader uniformly and without side-slipping.

Having now described my invention, what I claim and desire to secure by Letters Patent, is:

1. In a motor driven vehicle having a pair of traction wheels driven through a differential, the combination with a pair of differential shafts separately driven through the differential, a pair of coaxially alined abutting jack shafts, each thereof having a gear and sprocket at one end, a chain for each sprocket being driven by a differential shaft, a gear on each wheel in mesh with a gear of the jack shaft, and a clutch between the jack shafts to operate the latter together and at the same speed and to form a bearing for the end of the driving jack shaft.

2. A clutch for the jack shafts of a tractor, as claimed in claim 1, including a clutch lever normally holding the clutch disconnected, and a handle for the lever to cause the latter to engage the clutch and rotate the abutting jack shafts and wheels together and at the same speed.

In testimony whereof I affix my signature.

FREDERIC W. JAMES.